US012162319B2

(12) United States Patent
Brunsch et al.

(10) Patent No.: US 12,162,319 B2
(45) Date of Patent: Dec. 10, 2024

(54) AIR SUSPENSION SYSTEM

(71) Applicant: SAF-HOLLAND GmbH, Bessenbach (DE)

(72) Inventors: Bernd Brunsch, Dreieich (DE); Konstantin Diener, Aschaffenburg (DE); Matthias Bönig, Freigericht-Horbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 203 days.

(21) Appl. No.: 17/311,926

(22) PCT Filed: Jan. 21, 2020

(86) PCT No.: PCT/EP2020/051348
§ 371 (c)(1),
(2) Date: Jun. 8, 2021

(87) PCT Pub. No.: WO2020/156873
PCT Pub. Date: Aug. 6, 2020

(65) Prior Publication Data
US 2022/0024269 A1 Jan. 27, 2022

(30) Foreign Application Priority Data
Jan. 31, 2019 (DE) .................... 10 2019 102 418.8

(51) Int. Cl.
*B60G 11/27* (2006.01)
*F16F 9/05* (2006.01)

(52) U.S. Cl.
CPC ............ *B60G 11/27* (2013.01); *F16F 9/05* (2013.01); *B60G 2202/152* (2013.01);
(Continued)

(58) Field of Classification Search
CPC .... F16F 9/05; F16F 2222/126; F16F 2230/30; B60G 11/27; B60G 2202/152; B60G 2206/424
See application file for complete search history.

(56) References Cited

U.S. PATENT DOCUMENTS 3,876,193 A * 4/1975 Clary ................. F16F 9/05
267/64.16
3,876,196 A 4/1975 Clary
(Continued)

FOREIGN PATENT DOCUMENTS

CN 102089167 A 6/2011
CN 104019173 A 9/2014
(Continued)

OTHER PUBLICATIONS

DE102013218024 A1 English machine translation (Year: 2015).*
(Continued)

*Primary Examiner* — Jason D Shanske
*Assistant Examiner* — Matthew James O'Neill
(74) *Attorney, Agent, or Firm* — Price Heneveld LLP

(57) ABSTRACT

An air suspension system, includes an air suspension bellows connected to a vehicle frame, and an air suspension piston connected to a link, wherein the air suspension bellows and the air suspension piston are connected to each other and enclose an inner air volume, the air suspension piston has a rolling surface for rolling of the air suspension bellows, the air suspension bellows has a contact portion for rolling on the rolling surface, the rolling surface or the contact portion has at least one opening, wherein contacting areas of the rolling surface and the contact portion define a contact surface, and wherein a fluidic connection for an air flow through the at least one opening between the inner air volume and an environment is enabled and prevented by a change in the contact surface that includes a relative movement of the air suspension bellows to the air suspension piston.

20 Claims, 4 Drawing Sheets

(52) U.S. Cl.
CPC .. *B60G 2206/424* (2013.01); *F16F 2222/126* (2013.01); *F16F 2230/30* (2013.01)

(56) References Cited

U.S. PATENT DOCUMENTS 10,161,471 B2 * 12/2018 Leonard ............... B60G 17/052
2008/0223671 A1 9/2008 Gleu

FOREIGN PATENT DOCUMENTS

| | | | | |
|---|---|---|---|---|
| CN | 105917134 A | 8/2016 | | |
| DE | 19505026 A1 | 8/1996 | | |
| DE | 102007034362 A1 | 1/2009 | | |
| DE | 102010028810 A1 | 11/2011 | | |
| DE | 102013110645 A1 | 3/2015 | | |
| DE | 102013218024 A1 * | 3/2015 | ............. | F16F 9/057 |
| DE | 102018106717 A1 | 9/2019 | | |
| EP | 0995925 A1 | 4/2000 | | |
| EP | 28460601 A1 | 3/2015 | | |
| JP | S5950241 | 4/1987 | | |
| WO | 2006061119 A1 | 6/2006 | | |
| WO | 2010006167 A2 | 1/2010 | | |

OTHER PUBLICATIONS

DE-102013218024-A1 Machine English translation (Year: 2015).*
European Patent Office; International Search Report; Apr. 16, 2020; entire document.

* cited by examiner

AIR SUSPENSION SYSTEM

BACKGROUND OF THE INVENTION

The invention concerns an air suspension system, in particular for commercial vehicles.

Air suspension systems are already known from the state of the art, these are used to suspend a wheel, axle or shaft from a vehicle frame. For this purpose, an internal air suspension volume is filled with air, whereby this volume can be compressed when the vehicle frame moves relative to the wheel, axle or shaft, so that a cushioning effect is achieved by the air contained in the volume. Such an air suspension system is shown for example in DE 10 2013 110 645 A1, where a valve is switched by the rolling of the air suspension bellows on the plunger in order to achieve a regulation of the spring height. However, the problem with these air suspension systems known from the state of the art is that if too high a pressure, especially the full boiler pressure, is used when filling the interior of the air suspension system, the air suspension system, especially the air suspension bellows, can be damaged.

It is therefore an object of the invention to provide an air suspension system which offers a particularly high degree of safety against damage and is also com-pact.

SUMMARY OF THE INVENTION

According to the invention, the air suspension system, in particular for commercial vehicles, comprises an air suspension bellows and an air suspension piston, wherein the air suspension bellows is indirectly and/or directly connected or designed to be connected to a first chassis part, in particular a vehicle frame, wherein the air suspension piston (30) is indirectly and/or directly connected or designed to be connected to a second chassis part, in particular a link or a longitudinal link, wherein the air suspension bellows and the air suspension piston are indirectly and/or directly connected to each other or are designed to be connected, wherein the air suspension bellows and the air suspension piston at least partially enclose an inner air volume, wherein the air suspension piston has a rolling surface for the rolling of the air suspension bellows, wherein the air suspension bellows has a contact portion for rolling on the rolling surface, wherein the rolling surface and/or the contact portion have at least one opening, wherein contacting areas of the rolling surface and the contact portion define a common contact surface, wherein a fluidic connection for an air flow through the at least one opening between, in particular from, the inner air volume and, in particular in, an environment is enabled or prevented by a change in the contact surface, in particular by a relative movement of the air suspension bellows to the air suspension piston. The air suspension system according to the invention serves in particular to cushion and/or dampen a relative movement between a first chassis part and a second chassis part. Preferably, the air suspension system is a commercial vehicle air suspension system. A commercial vehicle in the sense of the invention is in particular a road-bound vehicle which advantageously has a maximum permissible gross vehicle weight of at least 3.51 t, preferably of at least 7.51 t and particularly preferably of at least 15 t. The air suspension system according to the invention comprises an air suspension bellows and an air suspension piston. The air suspension bellows is preferably arranged on a first chassis part, wherein the first chassis part is advantageously a vehicle frame. The air suspension bellows is preferably made predominantly of an elastic material, such as rubber. The air suspension piston of the air suspension system according to the invention is connected in particular indirectly and/or directly to a second chassis part, the second vehicle part preferably being a link. Alternatively or additionally preferred, the first chassis part and/or the second chassis part can also be formed, for example, by a part of a wheel bearing housing, a part of an axle or shaft. The air suspension bellows and the air suspension piston are connected in particular indirectly and/or directly to one another, preferably by clamping one end of the air suspension bellows to the plunger. This can be achieved, for example, by using a clamping plate, wherein one end of the air suspension bellows is clamped between the clamping plate and the plunger, so that the air suspension piston and the air suspension bellows are connected to each other in a frictional manner. The air suspension bellows and the plunger of the air suspension system at least partially enclose an inner air volume. This inner air volume of the air suspension system comprises at least the working volume of the air suspension system, which serves to be compressed or decompressed when the first chassis part is sprung in and out relative to the second chassis part, in order to achieve a springing of the first chassis part relative to the second chassis part. In other words, this can mean that the working volume of the air suspension system forms at least part of the inner air volume. It is advantageous that this inner air volume is enclosed or fluidically separated from other volumes, in particular from the environment, so that an air flow from this inner air volume is only possible through the opening and through connecting elements for loading and/or emptying the inner air volume. The opening extends advantageously in such a way that a fluidic connection for an air flow between the inner air volume and the environment is directly possible or can be made possible through it. In other words, this can mean that the opening can directly connect the air volume with the environment, in particular without any further pipe element. The air suspension piston, which is advantageously designed as a plunger, has a rolling surface, in particular in its jacket area, which serves to allow a contact section of the air suspension bellows to roll on this rolling surface during the spring deflection movement of the air suspension system. In other words, this means that the rolling surface of the air suspension piston serves to allow the contact portion of the air suspension bellows to roll on this rolling surface during the compression movement of the first chassis part to the second chassis part. The rolling surface does not necessarily have to be a continuous surface, but the rolling surface of the air suspension piston can be formed by all surfaces which are designed to allow the contact portion of the air suspension bellows to roll against them. The contact portion of the air suspension bellows is in particular that area of the air suspension bellows which serves to be able to roll on the rolling surface of the air suspension piston. In other words, the contact portion can therefore be formed by those parts of the air suspension bellows which, when installed, are able to contact the rolling surface. Advantageously, the contact portion of the air suspension bellows is formed by the area of the air suspension bellows near the end portion of the air suspension bellows which is directly and/or indirectly connected to the air suspension piston. The contacting areas of the rolling surface and the contact portion define a contact surface. In other words, this may mean that the areas of the rolling surface and the contact portion which are in, in particular direct, contact with each other form or define the contact surfaces. In the rolling surface or contact portion, the air suspension system according to the invention has an opening, especially a circular opening. This opening extends advantageously in such a way that one end of the opening ends/opens within the inner air volume and the other end of the opening ends/opens in the environment. In other words, the opening connects the inner air volume, in particular directly, with the environment. The air suspension system according to the invention is designed in such a way that by changing the contact surface, in particular by a relative movement of the air suspension bellows to the air suspension piston, an air flow through the at least one opening from the inner air volume into the environment is enabled or prevented. In other words, this may mean that by a relative movement of the air suspension bellows to the air suspension piston or by a relative movement of the first chassis part to the second chassis part a change in the contact surface, in particular an increase in the contact surface, leads to a flow of air through the at least one opening from the inner air volume to the environment being prevented, for example due to covering the opening with the contact portion. However, when the air suspension system is deflected, from a certain level of deflection onwards, a flow of air through the opening becomes possible, so that an air flow can flow from the inner air volume into the environment, for example by setting free the opening by the contact portion. In terms of the invention, prevention of an air flow can be understood to mean that the maximum volume flow in the "prevented" state should correspond to 20%, preferably 10%, more preferably 5% and most preferably 1% of the maximum air flow in the "enabled" state. In other words, this may mean that even in the "prevented" position, some air leakage through the opening may be possible, but advantageously, in the "prevented" position, air flow through the opening is completely prevented. The design of the air suspension system according to the invention enables the air suspension system to provide a particularly high degree of safety, because if the air suspension system is filled with too high a pressure, an escaping air flow into the environment—through the opening—is automatically achieved. This prevents overloading of the air suspension system.

Advantageously, a sealing element, in particular an O-ring, is arranged in and/or around the opening. This can prevent or at least reduce damage to the air suspension bellows. Alternatively or additionally preferred, a particularly high sealing effect can be achieved by this. The sealing element is in particular designed in such a way that it surrounds the opening and/or is arranged circumferentially within the opening. Advantageously, the sealing element is arranged in such a way that it is located on the side of the opening facing the environment and/or protrudes over the opening. In other words, the sealing element can therefore be arranged in such a way that in the state of the air suspension system in which air flow through the opening is prevented, the sealing element is compressed. It is advantageous for the sealing element to contact the rolling surface and/or the contact portion directly in the prevented state. This allows a particularly high degree of impermeability to be achieved.

Preferably, the opening has a first end and a second end, the first end of the opening opening into the inner air volume, and the second end of the opening being arranged and/or opening in/into the rolling surface or in/into the contact portion. By this design of the opening, a particularly short fluidic connection between the inner air volume and the environment can be achieved, so that a particularly low resistance induced by the opening against the air flow can be achieved. In other words, this can mean that the opening is designed as a direct connection between the internal air volume of the air suspension system and the environment.

In an advantageous embodiment, a fluid distance between the first end and the environment is a maximum of 2 cm, preferably a maximum of 1.5 cm and more preferably a maximum of 0.9 cm. The fluid distance is in particular the distance that an air stream must travel from the first end to the entry into the environment, in particular at the second end. Decisive for determining the length of the fluid distance is in particular the maximum or average length of the air flow from the first end of the opening to the environment. If the length of the fluid distance is 2 cm, a particularly light design of the air suspension system can be achieved, because this requires a particularly thin-walled design of the air suspension piston or air suspension bellows. In order to enable a particularly good fluid conduction through the opening, the fluid distance should be a maximum of 1.5 cm. With a maximum fluid distance of 0.9 cm, a particularly easy to produce opening can be achieved.

Advantageously, the length of the opening to the cross-sectional area of the opening is in a ratio in the range of 0.1 to 0.6, preferably in the range of 0.2 to 0.5 and more preferably in the range of 0.27 to 0.4. The length of the opening is in particular the shortest distance between the first end of the opening and the second end of the opening. Alternatively or additionally preferred, the relevant length of the opening can also be formed by the fluid distance of the aperture. The cross-sectional area of the opening which is decisive for determining the ratio is, in particular, the smallest cross-sectional area of the opening. The cross-sectional area of the opening is advantageously determined perpendicular to the mean direction of flow of the air flow through the opening. A ratio of the length of the opening to the cross-sectional area of the opening in the range of 0.1 to 0.6 results in a particularly low flow resistance. A ratio in the range of 0.2 to 0.5 results in an opening that is particularly easy to produce. In order to achieve a particularly compact air suspension system, in particular a particularly compact air suspension piston, the ratio of the length of the opening to the cross-sectional area of the opening should be in the range of 0.27 to 0.4.

Expediently, the opening extends in a straight line. By extending the opening in a straight line, a particularly low flow resistance against air flow through the opening can be achieved. In this context, straight-line can be understood to mean that the opening does not have a curved course along the direction of the air flow through the opening. Alternatively or additionally preferred the cross section of the opening is constant over its length. This makes it possible to achieve a particularly simple production of the opening, resulting in a cost-effective air suspension system. It should be noted, however, that smaller chamfers may be provided, in particular in the edge areas of the air suspension system, the length of which, however, should not exceed 10%, preferably not more than 5% of the length of the opening, which should not be used to determine the relevant cross-section. In other words, this can mean that a constant cross-section of the opening can be present even if the ends of the opening are chamfered or have grooves for the insertion of a sealing element.

Preferably, the air suspension system comprises a valve arrangement, wherein the valve arrangement enables or prevents an air flow through the opening from the inner air volume to the environment. By providing a valve arrangement, a particularly safe prevention of air flow through the opening can be achieved. It is particularly preferable if the switching of the valve arrangement is effected directly by the relative movement of the air suspension bellows to the air suspension piston, in particular without the use of servomotors or other active actuating means. In other words, this can mean that only the relative movement of the first chassis part to the second chassis part or from the air suspension bellows to the air suspension piston enables or prevents the valve arrangement from enabling or preventing air flow from the inner air volume to the environment. Therefore, the relative movement in particular can be the sole cause of the change in the switching state of the valve arrangement. Active actuating means" can be understood to mean means, in particular motors or coils, which are supplied by an external energy source, in particular by batteries. It is advantageous that the valve arrangement is designed and/or arranged in such a way that it extends partially into the opening. In this way a particularly compact valve arrangement can be achieved. It is advantageous that the valve arrangement is at least partially arranged directly and/or indirectly on the rolling surface or the contact portion. In this way a particularly space-saving valve arrangement can be achieved to enable or prevent the air flow through the opening.

In a preferred embodiment, the valve arrangement comprises a closing body, wherein the closing body enables or prevents an air flow through the opening from the inner air volume into the environment by a translatory or rotational movement, in particular relative to the rolling surface or contact portion. This allows a particularly simple design of the valve arrangement in a cost-effective manner. The closing body of the valve arrangement is in particular the part of the valve arrangement which prevents and/or permits an air flow. In other words, the closing body can therefore be the part of the valve arrangement which is responsible for preventing or enabling the air flow. It is particularly preferable that the closing body is designed in such a way that in the closed position it completely covers the opening, especially at its second end. This makes it particularly easy to achieve a closing body which prevents air flow through the opening. It is advantageous that the projection of the closing body in the direction of the extension of the opening and/or in the direction of the air flow through the opening and/or in the direction of the fluid distance encloses the projection of the opening in this direction. In other words, the closing body, viewed in the direction of flow, can be larger than the cross-section of the opening at its first and/or second end.

In a preferred embodiment, the closing body, when air flow through the opening from the inner air volume into the environment is prevented, is arranged at least partially between the rolling surface and the contact portion. This allows a particularly compact valve arrangement to be achieved. In particular, if air flow is prevented, the closing body contacts the rolling surface, the contact portion and/or the sealing element directly in order to prevent air flow through the opening in a particularly simple and compact way.

In an advantageous embodiment, the closing body is formed from plastic. This allows a strong reduction or prevention of corrosion to be achieved. Alternatively or additionally preferred, the closing body can also be made of a metallic material, in particular aluminium or steel, in order to achieve a particularly mechanically resilient valve arrangement.

In a particularly preferred embodiment, the closing body has a film joint and/or is connected via a film joint to the plunger, in particular to the rolling surface. This allows a mechanical connection of the closing body to be achieved in a particularly cost-effective and simple manner, resulting in a cost-effective air suspension system in particular.

Advantageously, the valve arrangement extends at least partially, preferably completely, into/through the opening. In this way a particularly compact valve arrangement can be achieved so that installation space can be saved.

Preferably, the valve arrangement comprises a spring element, wherein the valve arrangement is advantageously designed in such a way that it allows an air flow through the opening in an unloaded state of the spring element. By providing a spring element, it is particularly easy to achieve a preload of the valve arrangement so that its unloaded switching state is clearly defined by the spring element. Advantageously, the spring element is designed in such a way that the spring element, in the state in which an air flow through the opening is possible, has a lower mechanical energy than when an air flow through the opening is prevented. In other words, the spring element is therefore designed in such a way that it attempts to move the valve assembly to the switching position in which air flow through the opening is possible.

Advantageously, the closing body is at least partially, preferably completely, concave on its side facing away from the opening. This can prevent or reduce damage to air suspension components, in particular the air suspension bellows and/or the air suspension piston. Advantageously, the side of the closing body facing away from the opening is mushroom-shaped. Especially preferred, the side of the closing body facing the opening is essentially planar. A surface is essentially planar in particular if the surface extends between two absolutely parallel planes or absolutely coaxial cylinders and the two ideally parallel planes have a maximum distance of 1 mm or the two absolutely coaxial cylinders have a difference in diameter of a maximum of 1 mm to each other. This essentially planar design of the part of the closing body that faces the opening enables a particularly high degree of sealing effect to be achieved.

Preferably, the rolling surface or the contact section has a plurality of openings, wherein preferably a valve arrangement is assigned to each opening. By providing a plurality of openings, in particular at least two, four or six, it can be ensured that a particularly low flow resistance for the entire air flow between the inner air volume and the environment is achieved.

Preferably the air suspension piston extends along a longitudinal direction, the air suspension bellows being arranged at a first distal end of the air suspension piston in the longitudinal direction, at least one opening having a distance in the longitudinal direction from the first distal end of the air suspension piston, the ratio of the distance to the maximum extension of the air suspension piston in the longitudinal direction being in a range from 0.05 to 0.5, preferably in a range from 0.1 to 0.35 and particularly in a range from 0.2 to 0.3. The longitudinal direction of the air suspension piston can in particular be the direction in which the air suspension piston extends. The longitudinal direction of the air suspension piston is advantageously aligned parallel to this axis of rotational symmetry if the jacket area of the air suspension piston and/or the rolling surface of the air suspension piston is rotationally symmetrical. Alternatively or additionally preferred the longitudinal direction of the air suspension piston is in particular the direction in which the air suspension piston must move for a spring in and spring out movement of the air suspension system. A ratio in the range of 0.05 to 0.5 results in an air suspension system with a particularly wide range of applications. A ratio in the range of 0.1 to 0.35 results in an air suspension system that offers a particularly high degree of safety against overpressure in the internal air volume. A ratio in the range of 0.2 to 0.3 results in an air suspension system that is particularly easy to manufacture.

Advantageously, the closing body is arranged in such a way that one of its ends, in particular the one facing a connecting area between the air suspension bellows and the air suspension piston, is designed as a free/moving end. In this way a quick closing of the valve arrangement and thus a prevention of air flow through the breakthrough can be achieved in a simple and effective way. Advantageously, the end facing away from the connecting area—between air suspension bellows and air suspension piston—is designed as a film joint in order to be fixed to the air suspension piston in particular.

BRIEF DESCRIPTION OF THE DRAWINGS

Further advantages and features of the present invention result from the following description with reference to the figures. Individual features of the depicted embodiments can also be used in other embodiments, unless this has been explicitly excluded.

It is shown in.

DETAILED DESCRIPTION OF THE PREFERRED EMBODIMENT

Figure 1:
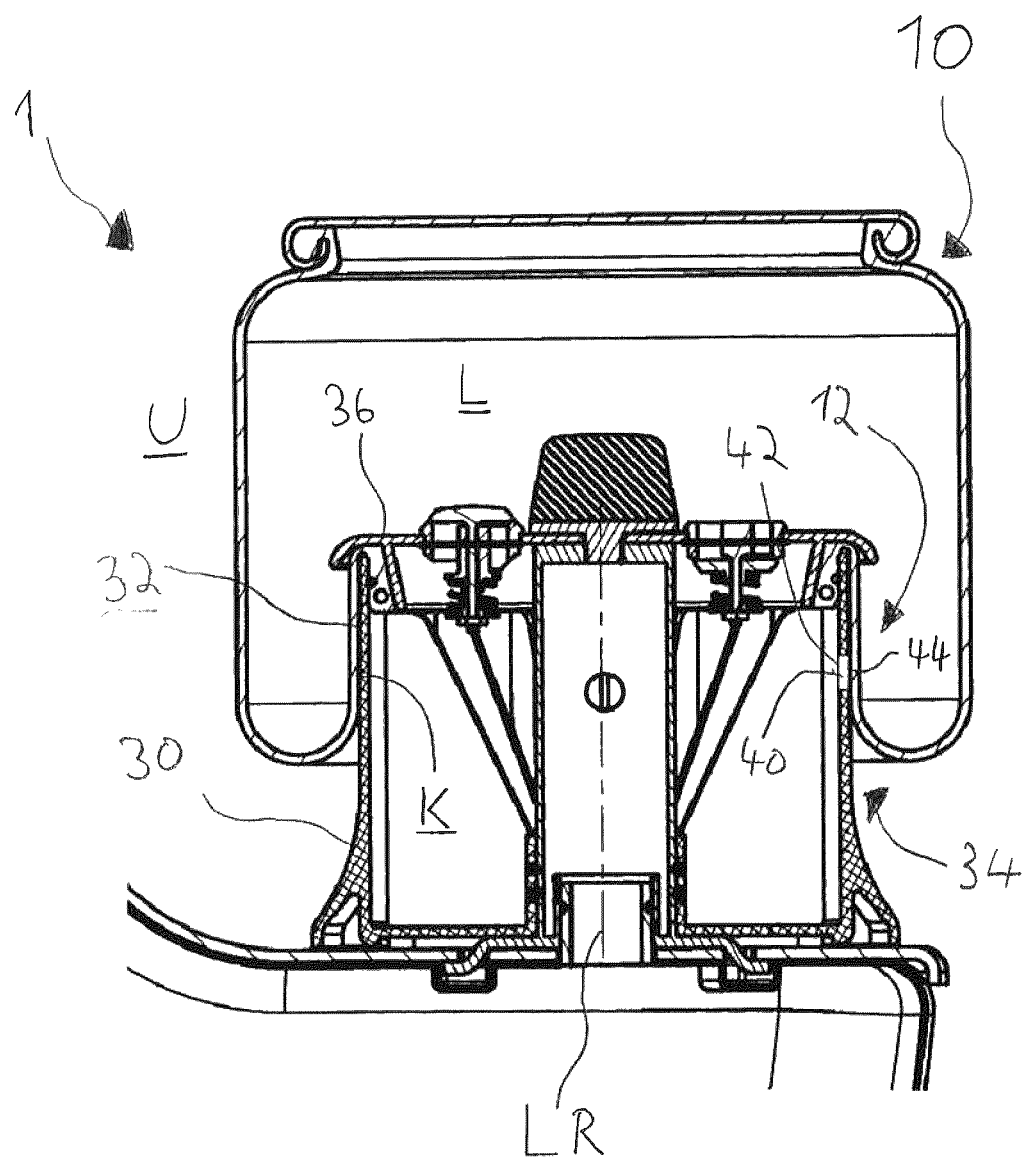
FIG. 1 is a sectional view of an air suspension system.

FIG. 1 shows an air suspension system 1 according to the invention. The air suspension system 1 comprises an air suspension bellows 10 and an air suspension piston 30, which is designed as a plunger in the form shown in FIG. 1. The air suspension bellows 10 has a contact section 12 which is in direct contact with the rolling surface 32 of the air suspension piston 30. These contacting areas of the rolling surface 32 and the contact section 12 define the contact surface K. The air suspension bellows 10 is mechanically connected to the plunger 30 via the clamping plate 36. The plunger 30 has the rolling surface 32 in its jacket area 34. An opening 40 is arranged in the rolling surface 32. This opening 40 has a first end 42 and a second end 44. The first end 42 of the opening 40 opens into the inner air volume L. This inner air volume L is formed by the working volume as well as by the volume inside the air suspension piston 30. These two volumes are fluidically connected to each other via the valves located in the clamping plate 36. The second end 44 of the opening 40 opens into the environment U. A relative movement of the air suspension bellows 10 in the longitudinal direction LR of the air suspension piston causes a change in the contact surface K. This change in the contact surface K allows a volume of air to flow through the opening 40. In the embodiment shown in FIG. 1, however, air is prevented from flowing through the opening 40, because part of the air suspension bellows 10 closes the opening 40, so that no fluidic connection between the internal air volume L and the environment U is possible through the opening 40.

Figure 2:
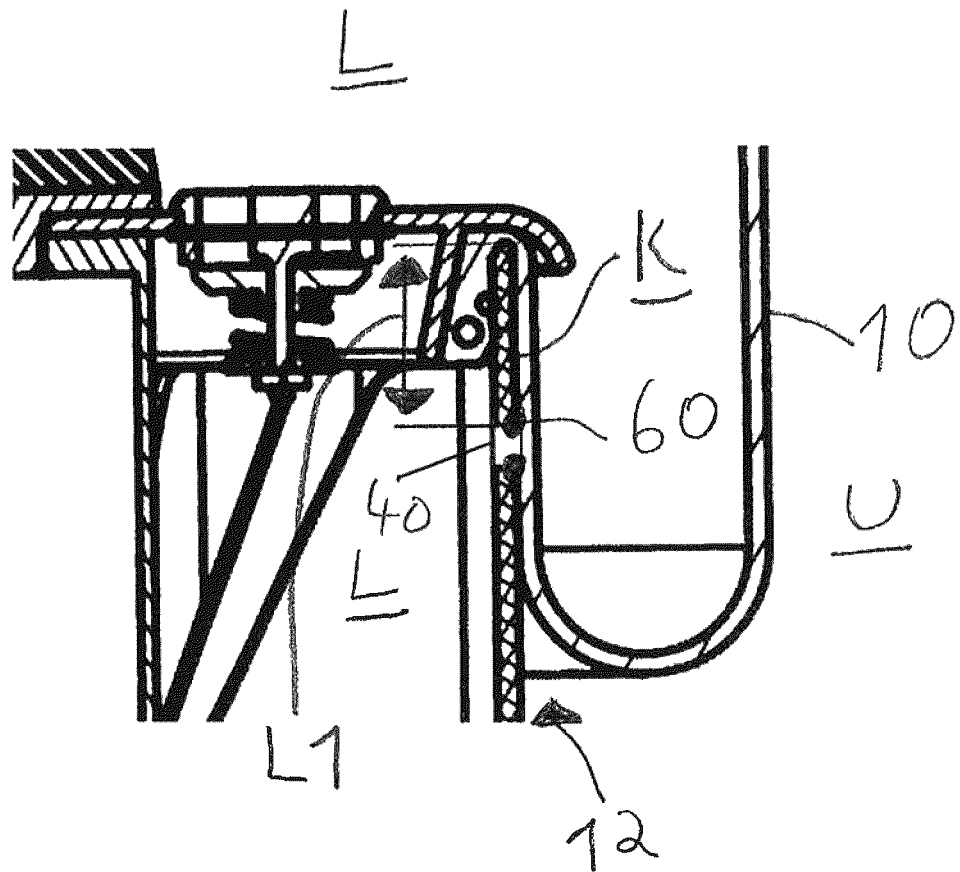
FIG. 2 is a detailed view of an air suspension system.

FIG. 2 shows a detailed view of an air suspension system. In the embodiment shown in FIG. 2, a sealing element 60, in the form of an O-ring, extends partially into the opening 40. In the embodiment shown in FIG. 2, an air flow is furthermore prevented between the internal air volume L and the environment U by the air bellows 10 and its contact portion 12. The opening 40 has a distance L1 in the longitudinal direction from the first distal end of the air suspension piston 30.

Figure 3:
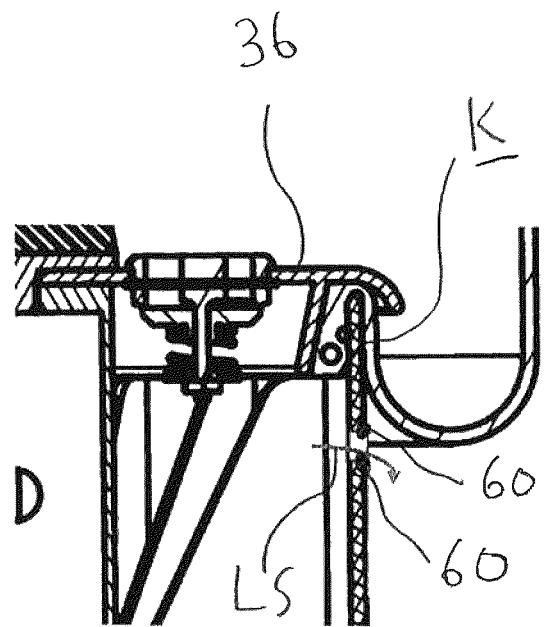
FIG. 3 is another detailed view of a section through an air suspension system.

FIG. 3 shows another detailed view of an alternative embodiment of an air suspension system, wherein the embodiment shown in FIG. 3 can in principle match the embodiment shown in FIG. 2. In the embodiment shown in FIG. 3, an air flow LS through the opening 40 is made possible, in particular because the contact surface K is significantly smaller than in a state in which an air flow LS through the opening is prevented, as is the case in the situation shown in FIG. 2, for example.

Figure 4:
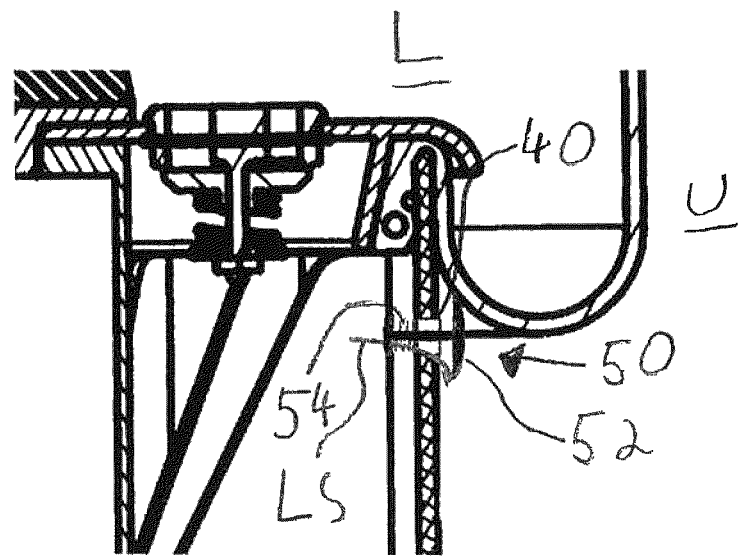
FIG. 4 is a detailed view of an air suspension system with a valve arrangement.

FIG. 4 shows another detailed view of an air suspension system that is in accordance with the invention. The air suspension system 1 has a valve arrangement 50, which has a closing body 52 and a spring element 54. The closing body 52 is designed in such a way that it is concave and mushroom-shaped on its side facing away from the opening 40. In the state shown in FIG. 4, an air flow LS through the opening 40 from the internal air volume L to the environment U is made possible, in particular because the valve arrangement 50 extending completely through the opening 40 is in an open state.

Figure 5:
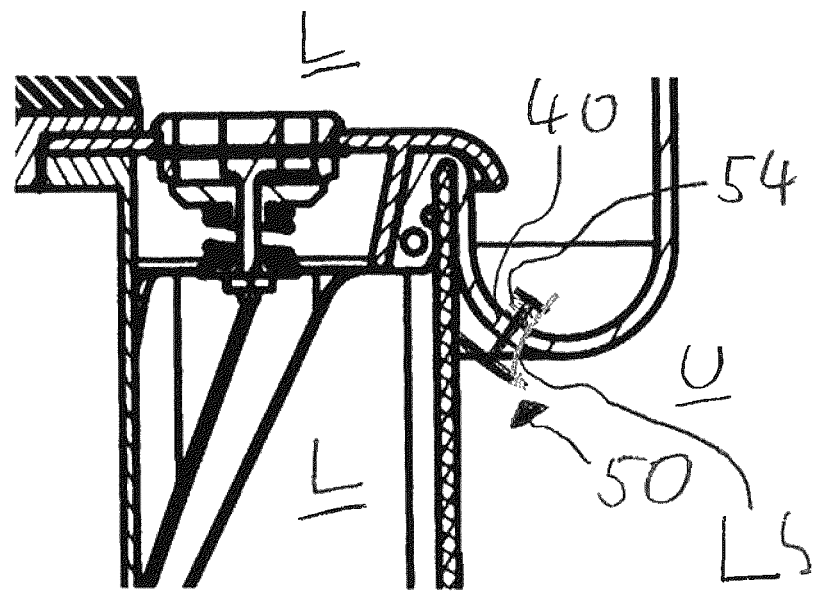
FIG. 5 is an alternative embodiment of an air suspension system with a valve arrangement.

FIG. 5 shows another detailed view of an embodiment of an air suspension system that is in accordance with the invention. The air suspension system shown in FIG. 5 differs from the air suspension system shown in FIG. 4 in particular in that the valve arrangement 50 and the opening 40 are located in the area of the contact section 12 of the air suspension bellows 10. In the state shown in FIG. 5, an air flow LS from the internal air volume L to the environment U is also enabled or possible.

Figure 6:
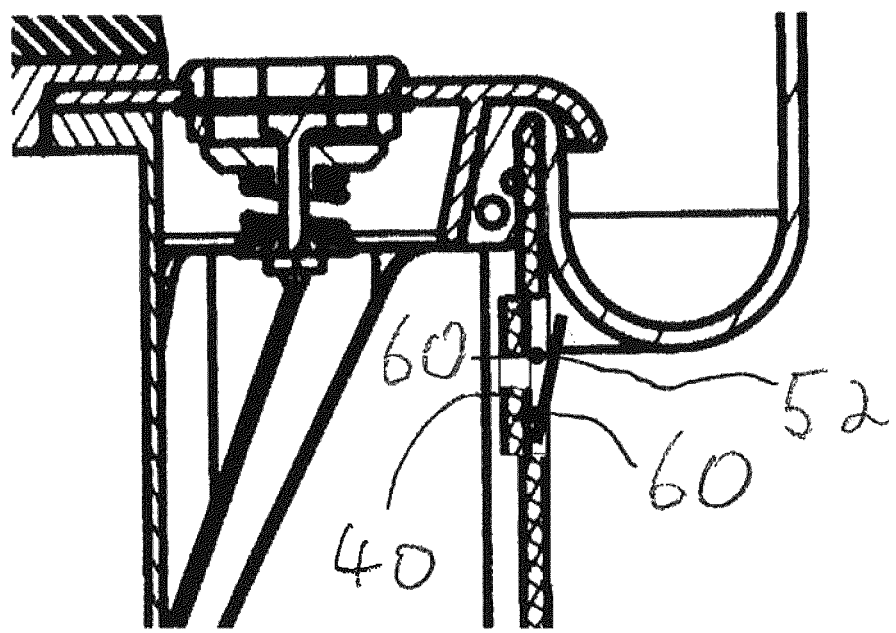
FIG. 6 is another alternative embodiment of an air suspension system with a valve arrangement.

FIG. 6 shows another detailed view of an air suspension system that is in accordance with the invention. In the valve arrangement shown in FIG. 6, the closing body 52 is plate-shaped and connected to the air suspension piston via a film joint. In the embodiment shown in FIG. 6, the valve arrangement 50 is designed in such a way that the closing body 52 does not protrude beyond the outer jacket area of the air suspension piston in a closed position.

LIST OF REFERENCE SIGNS

1—Air suspension system
10—Air suspension bellows
12—Contact portion
30—Air suspension piston
32—Rolling surface
34—Jacket area
36—Clamping plate
40—Opening
42—First end of the opening (40)
44—Second end of the opening (40)
50—Valve arrangement
52—Closing body
54—Spring element
60—Sealing element
K—Contact surface
L—inner air volume
LR—Longitudinal direction of the air suspension piston (30)

L1—distance in longitudinal direction of the opening (40) from the first distal end of the air suspension piston (30)
LS—Air flow
U—Environment

The invention claimed is:

1. An air suspension system for commercial vehicles, comprising:
    an air suspension bellows;
    an air suspension piston; and
    a valve arrangement;
    wherein the air suspension bellows is configured to be at least one of indirectly and directly connected to a first chassis part that includes a vehicle frame;
    wherein the air suspension piston is configured to be at least one of indirectly and directly connected to a second chassis part including a link,
    wherein the air suspension bellows and the air suspension piston are at least one of indirectly and directly connected to each other;
    wherein the air suspension bellows and the air suspension piston at least partially enclose an inner air volume;
    wherein the air suspension piston has a rolling surface for rolling of the air suspension bellows;
    wherein the air suspension bellows has a contact portion for rolling on the rolling surface;
    wherein at least one of the rolling surface and the contact portion have at least one opening;
    wherein contacting areas of the rolling surface and the contact portion define a contact surface;
    wherein a fluidic connection for an air flow through the at least one opening between the inner air volume and an environment external to the air suspension system is enabled or prevented by a change in the contact surface that includes a relative movement of the air suspension bellows to the air suspension piston;
    wherein the at least one opening has a first end and a second end, the first end of the at least one opening directly opening into the inner air volume, and the second end of the at least one opening being at least one of arranged in and opening into the rolling surface or the contact portion and directly opening into the environment such that air passing between the inner air volume and the environment passes through the at least one opening of the at least one of the rolling surface and the contact surface only; and
    wherein the valve arrangement is configured to enable and prevent an air flow through the at least one opening from the inner air volume to the environment.

2. The air suspension system according to claim 1, wherein a sealing element that includes an O-ring, is arranged at least one of in and around the at least one opening.

3. The air suspension system according to claim 1, wherein a fluid distance between the first end and the environment is a maximum of 2 cm.

4. The air suspension system according to claim 3, wherein the maximum of the fluid distance is 1.5 cm.

5. The air suspension system according to claim 4, wherein the maximum of the fluid distance is 0.9 cm.

6. The air suspension system according to claim 1, wherein a ratio of a length of the at least one opening to a cross-sectional area of the at least one opening is in the range of 0.1 to 0.6.

7. The air suspension system according to claim 6, where the ratio is in the range of 0.2 to 0.5.

8. The air suspension system according to claim 7, wherein the ratio is in the range of 0.27 to 0.4.

9. The air suspension system according to claim 1, wherein the at least one opening extends in a straight line.

10. The air suspension system according to claim 1, wherein the valve arrangement comprises a closing body, wherein the closing body is configured to enable and prevent the air flow through the at least one opening from the inner air volume into the environment by a translatory or by a rotational movement relative to the rolling surface or to the contact portion.

11. The air suspension system according to claim 10, wherein the closing body is arranged at least partially between the rolling surface and the contact portion when the air flow through the at least one opening from the inner air volume into the environment is prevented.

12. The air suspension system according to claim 11, wherein the closing body comprises plastic.

13. The air suspension system according to one claim 10, wherein the closing body has a film joint.

14. The air suspension system according to claim 1, wherein the valve arrangement extends at least partially into the at least one opening.

15. The air suspension system according to claim 14, wherein the valve arrangement extends completely through that at least one opening.

16. The air suspension system according to claim 1, wherein the valve arrangement comprises a spring element, and wherein the valve arrangement is configured to allow an air flow through the at least one opening in an unloaded state of the spring element.

17. The air suspension system according to claim 10, wherein the closing body is concave on a side of the closing body facing away from the at least one opening.

18. The air suspension system according to claim 1, wherein the at least one opening includes a plurality of openings, wherein a valve arrangement is assigned to each of the openings.

19. The air suspension system of claim 10, wherein the closing body is connected to the rolling surface via a film joint.

20. The air suspension system of claim 1, wherein the at least one opening is free from restrictions.

* * * * *